Jan. 6, 1925.
F. HAWES
1,522,185
ARTIFICIAL FISH BAIT
Filed July 26, 1922
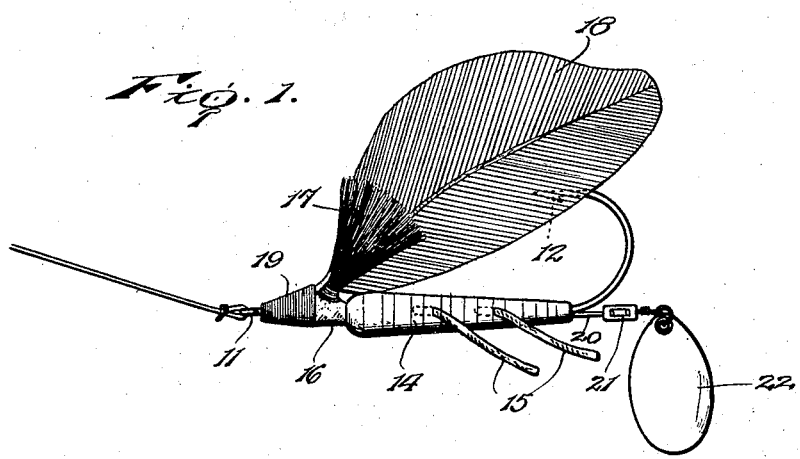
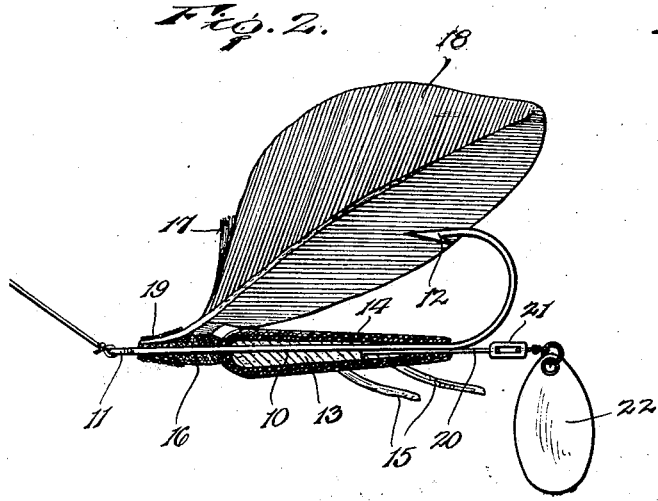
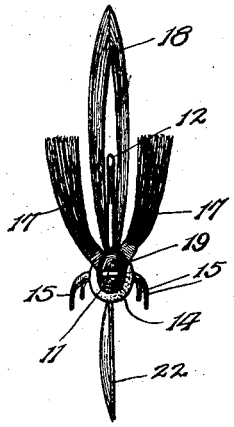
Inventor
F. Hawes.
By
Lacey & Lacey, Attorneys Patented Jan. 6, 1925.

1,522,185

UNITED STATES PATENT OFFICE.

FRANK HAWES, OF ISLAND LAKE, WISCONSIN.

ARTIFICIAL FISH BAIT.

Application filed July 26, 1922. Serial No. 577,604.

*To all whom it may concern:*

Be it known that I, FRANK HAWES, citizen of the United States, residing at Island Lake, in the county of Rusk and State of Wisconsin, have invented certain new and useful Improvements in Artificial Fish Bait, of which the following is a specification.

This invention relates to an improved artificial fish bait and seeks, as one of its principal objects, to provide a device of this character embodying a hook and wherein a spinner will be mounted at the rear end of the hook for attracting the attention of fish.

A further object of the invention is to provide a bait which will simulate a fly or winged insect for luring the fish.

And the invention has as a still further object to provide a hook wherein the wings of the fly will serve to hide and protect the point of the hook so that the hook will not catch in moss or grass.

Other and incidental objects will appear hereinafter.

In the drawing:

Figure 1 is a side elevation of my improved hook,

Figure 2 is a sectional view of the device, and

Figure 3 is an end elevation of the device.

Referring now more particularly to the drawing, I employ a hook embodying a shank 10 provided at its forward end with an eye 11 to receive a line while at its opposite end the shank is curved laterally and provided with a barb 12 in advance of which the hook is sharpened to a point. Mounted upon the shank 10 of the hook is a weight 13, the greater portion of the bulk of which lies beneath the shank and wrapped about the weight is a cord or the like, the turns of which are arranged to define a longitudinally tapered bait body 14. Secured to opposite sides of the bait body, beneath one or more turns of said cord, are legs 15 which are preferably formed of strips of rubber so that in the practical use of the device the legs will dangle from the bait body and will flex in the water so as to impart a life-like appearance to the bait. The bait body is preferably decorated with bright colors so as to render the body gaudy and conspicuous and, as suggested in Figure 1, the body is preferably colored in alternate encircling bands of different hues. Wrapped about the shank 10 at the forward end of the bait body, is a cord the turns of which are disposed to define a reduced head 16 for the bait body, the head being tapered toward the forward end of the hook and being preferably colored black to thus further enhance the life-like appearance of the bait. Secured by the turns of said cord are upstanding preferably hair tufts 17 at opposite sides of the head and sloping rearwardly between the tufts are upstanding wings 18. These wings are secured at their inner ends by a cord 19 wrapped about the head and may be formed of feathers or hair. As particularly brought out in Figures 2 and 3, the wings incline upwardly across the mouth of the hook, extending at opposite sides of the point thereof and touch at their upper edges throughout the major portion of their length and also touch at their tips while at their lower edges said wings are slightly spaced apart to accomodate the point of the hook therebetween. The wings will thus protect the point of the hook and provide a guard for preventing the hook from catching in grass or moss while, at the same time, the wings will also serve to hide or conceal the point of the hook. Embedded in the rear end of the weight 13 beneath the hook shank 10 is a longitudinally directed rod 20 projecting at the rear of the hook and mounted upon said rod is a link 21 upon which is swiveled a spinner 22.

In use, the weight 13 will, since the bulk of said weight is, as previously noted, disposed beneath the shank 10 of the hook, function in conjunction with the wings 18, to maintain the hook, when in the water, in the position shown in the drawing, the wings acting as a single vane tending to hold the hook right side up. As will be seen, the spinner 22 will, as the device is drawn forwardly, turn or move in the water for attracting the attention of fish to the bait. This spinner may be formed of a piece of brightly colored or shiny shell or may be of other suitable character but, in any event, will be adapted to glisten in the water so as to be readily noticeable. The spinner will thus serve to lure the fish to take the bait. I accordingly provide a bait which will be found particularly effective in practical use.

Having thus described the invention, what is claimed as new is:

1. In an artificial fish bait, the combination of a hook, a weight carried by the shank of the hook and having the major portion of its bulk disposed at the back of the shank, a substantially flat vane upstanding from the shank and presented edgewise to the forward end of the shank to cooperate with said weight for maintaining the point of the hook uppermost in the water, and a spinner mounted at the rear of the hook.

2. In an artificial fish bait, the combination of a hook, a weight carried by the shank of the hook and having the major portion of its bulk disposed at the back of the shank, a pair of feathers presented edgewise to the forward end of the shank and inclining rearwardly and upwardly to form a vane to cooperate with the weight for maintaining the point of the hook uppermost in the water, and a spinner mounted at the rear of the hook.

3. In an artificial fish bait, the combination of a hook, a weight carried by the shank of the hook and having the major portion of its bulk disposed at the back of the shank, a pair of feathers presented edgewise to the forward end of the shank and inclining rearwardly and upwardly to form a vane to cooperate with said weight for maintaining the point of the hook uppermost in the water, said feathers extending at opposite sides of the point of the hook concealing said point, and a spinner mounted at the rear of the hook.

In testimony whereof I affix my signature.

FRANK HAWES.